Feb. 11, 1930.  H. T. THOMAS  1,746,325
UNIVERSAL JOINT CONSTRUCTION
Filed Jan. 14, 1926   2 Sheets-Sheet 1
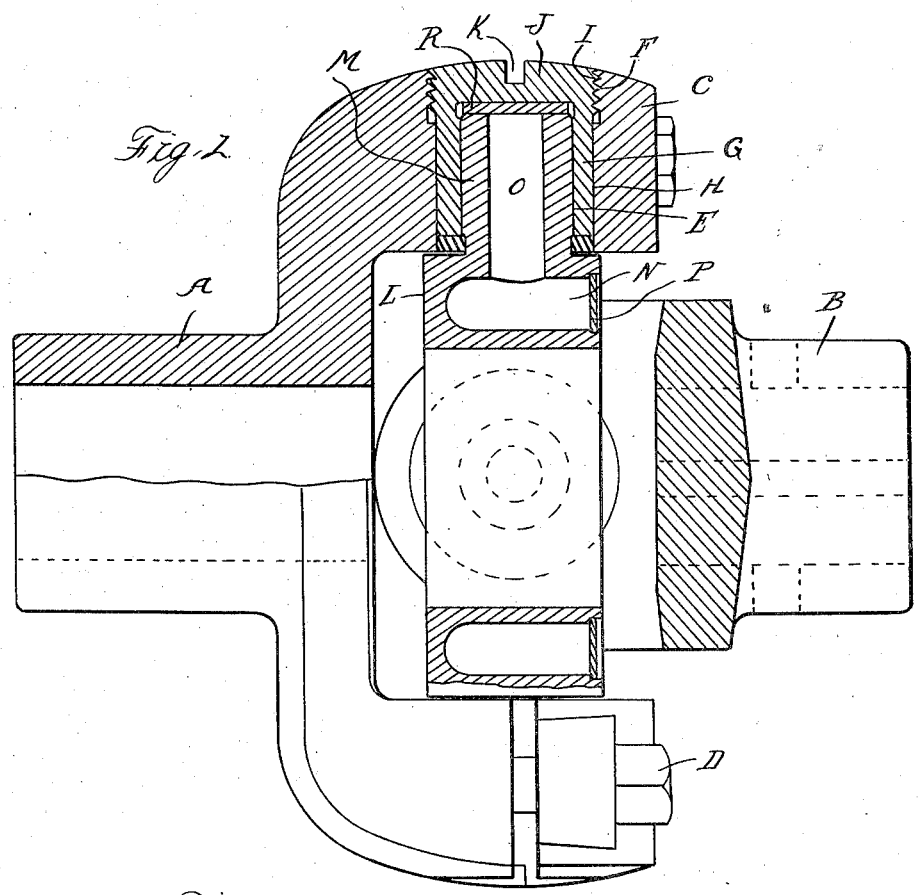
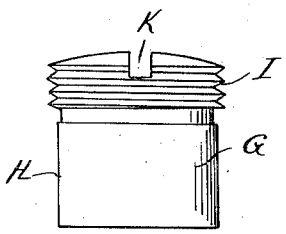
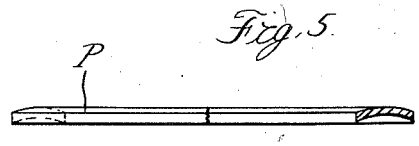
Inventor
Horace T. Thomas
By
Attorneys Feb. 11, 1930.  H. T. THOMAS  1,746,325
UNIVERSAL JOINT CONSTRUCTION
Filed Jan. 14, 1926   2 Sheets-Sheet 2
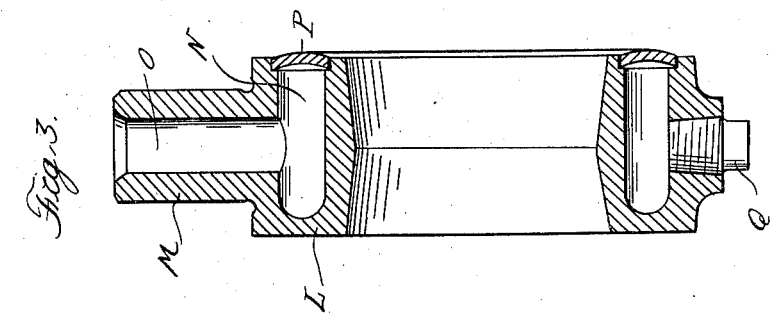
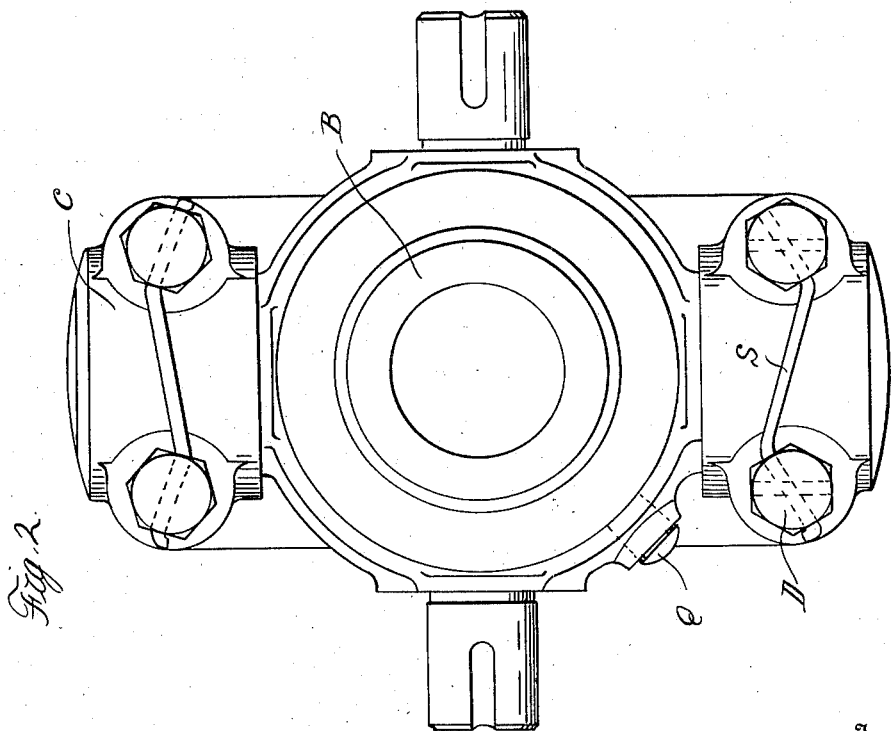
Inventor
Horace T. Thomas
By
Attorneys Patented Feb. 11, 1930

1,746,325

UNITED STATES PATENT OFFICE

HORACE T. THOMAS, OF LANSING, MICHIGAN, ASSIGNOR TO REO MOTOR CAR COMPANY, OF LANSING, MICHIGAN, A CORPORATION OF MICHIGAN

UNIVERSAL-JOINT CONSTRUCTION

Application filed January 14, 1926. Serial No. 81,289.

The invention relates to universal joints for shafting and of that type in which bifurcated members secured to the shaft sections are arranged in transverse planes to engage radially extending trunnions on a third or connecting member.

It is the object of the invention to obtain a construction of this type having certain advantages particularly relating to the means for lubricating the bearings and for adjusting so as to secure proper alignment. With these objects in view the invention consists in the construction as hereinafter set forth.

In the drawings;

Figure 1 is a longitudinal central section through my improved joint.

Figure 2 is an elevation thereof with one of the bifurcated members removed.

Figure 3 is a cross section through the trunnion member showing the manner of forming the lubricant chamber therein.

Figure 4 is an elevation of one of the bushings detached.

Figure 5 is a sectional side elevation of the cap P before engagement of the same with the member L.

A and B are the two bifurcated members secured to the respective shaft sections and which are of like construction. Each of these members is provided with bearing supports in the furcations thereof with detachable caps C secured by the clamping bolts D. These supports preferably have smooth cylindrical portions H and internally threaded portions F at the outer ends thereof. G are bushings for engaging said bearing supports which also have smooth cylindrical portions E and threaded portions I. The outer ends of said bushings are closed by the integral head J which has the cross slot K on its outer side for the engagement of a suitable tool for adjusting the bushing.

L is a trunnion member which is preferably annular in form and provided with the radially upwardly extending pairs of trunnions M having their axes in transverse planes. The annular portion of the member L is provided with the annular recess N communicating with the radially outwardly extending channels O in each of the trunnions.

The recess N is closed by a cap member P pressed into engagement therewith, said member being preferably first formed with a slightly curved cross section which is straightened when it is pressed into engagement with the recess. This will produce a sealed joint so that lubricant may be contained in the recess N without danger of leakage. There is also provided a plugged aperture Q through which the lubricant may be introduced.

With the construction described the parts may be readily assembled by first placing the bushings G on the trunnion pins M and then engaging these members with the bearing supports in the furcations of the members A and B clamping them by the caps C. A hardened plate R is preferably inserted between the end of each trunnion and the head J of the bushing to take end thrust to minimize wear.

To adjust the joint into proper alignment the bushing G may be rotated by a suitable tool engaging the slots K and by reason of the thread I will be moved axially inward or outward. This will also take up any lost motion between the heads J, hardened plates R and the ends of the trunnions N. When properly adjusted the clamping screws D are tightened and locked by suitable means such as indicated at S.

In operation, the lubricant which is stored in the channel N will be forced outward by centrifugal action through the channels O to the outer ends of the trunnions M. Inasmuch, however, as the bushings G are closed at their outer ends, the pressure developed by centrifugal action will force the lubricant radially inward between the trunnions and the bushings. In this way thorough lubrication is maintained as long as any lubricant remains in the channel N.

The member L being of annular form, leaves an open centre through which a tool may be introduced to engage the clamping nut or other means for securing the bifurcated member to its shaft.

What I claim as my invention is:

1. In a universal joint, the combination with bifurcated shaft members having bearing supports in the furcations thereof, of a trunnion member having an annular portion provided with an annular chamber, opening laterally of said trunnion member, a closure for said chamber comprising a cap pressed into the mouth of said chamber to seal the same, and trunnions extending radially outward from said annular member having central channels communicating with said annular chamber.

2. In a universal joint, the combination with bifurcated shaft members having bushings in the furcations thereof closed at their outer ends, of a trunnion member having an annular portion provided with an annular chamber opening laterally of said trunnion member, an annular cap closing said chamber, trunnions extending radially outward from said annular member and provided with central channels communicating with said annular chamber, said trunnions engaging said closed end bushings whereby lubricant in said channel will be forced by centrifugal action between said trunnions and bushings.

3. In a universal joint, the combination with bifurcated shaft members having bearing supports in the furcations thereof, of a trunnion member having an annular portion provided with an annular chamber opening laterally of said trunnion member, means for closing said chamber to seal the same, and trunnions extending radially outward from said annular member, said trunnions having channels communicating with said annular chamber.

4. In a universal joint, the combination with bifurcated shaft members having bearing supports in the furcations thereof, of a trunnion member having an annular chamber opening laterally thereof, means for closing said chamber to seal the same, and trunnions extending radially outwardly from said trunnion member, said trunnions having channels communicating with said annular chamber.

In testimony whereof I affix my signature.

HORACE T. THOMAS.